United States Patent [19]
Yamashita et al.

[11] 3,729,630
[45] Apr. 24, 1973

[54] THERMOLUMINESCENCE READOUT INSTRUMENT

[75] Inventors: Tadaoki Yamashita; Osamu Yamamoti, both of Hirakata, Japan

[73] Assignee: Matsushita Electric Industrial Co., Ltd., Osaka, Japan

[22] Filed: Jan. 26, 1971

[21] Appl. No.: 109,920

[30] Foreign Application Priority Data

Feb. 5, 1970  Japan..................................45/10451
Feb. 5, 1970  Japan..................................45/10452

[52] U.S. Cl. ..........................250/71.5 R, 250/71 R
[51] Int. Cl. ...............................................G01t 1/11
[58] Field of Search .....................250/71 R, 71.5 R, 250/84

[56] References Cited

UNITED STATES PATENTS

| 2,902,605 | 9/1959 | Wallack | 250/71 R X |
| 3,412,248 | 11/1968 | Kastner | 250/71 R X |
| 3,496,489 | 2/1970 | Lin | 250/71 R X |

*Primary Examiner*—Archie R. Borchelt
*Attorney*—Stevens, Davis, Miller & Mosher

[57] ABSTRACT

A thermoluminescence readout instrument utilizing a thermoluminescence dosimeter element which is heated by infrared rays from a laser source and which emits thermoluminescence, the thermoluminescence being transformed into a photocurrent so as to detect the dose irradiated on the element. The device is characterized by having good reproducibility in the heating of the element, providing good reproducibility and reliability of measurement, and a reduction of the time required for the measuring operation.

4 Claims, 4 Drawing Figures

THERMOLUMINESCENCE READOUT INSTRUMENT

This invention relates to a thermoluminescence readout instrument and is intended to improve the reliability and simplify the operation of such instruments.

Thermoluminescent dosimeters have various advantages compared with other conventional dosimeters and can eliminate most of the disadvantages of conventional dosimeters. A thermoluminescent dosimeter is mainly composed of a thermoluminescent dosimeter element sensitive to radiation and a readout instrument for reading out the thermoluminescence emitted from the element upon heating: an element irradiated by radiation is heated in a readout instrument, the amount of the emitted thermoluminescence is read, converted into the equivalent dose and indicated to show the dose irradiated onto the element. A structural feature of such a readout instrument lies in the heating part for heating the element. The structure and function of this heating part directly influence the reliability of the dosimeter.

In conventional thermoluminescent dosimeters, such methods as:

1. installing an electric resistor in the element;
2. bringing the element into contact with an electric resistor mounted in a readout instrument;
3. bringing the element in the neighborhood of an electric resistor mounted in a readout instrument, e.g., disposing the element within a coil-shaped electric resistor; and
4. disposing the element on a heating solid which has preliminarily been heated, are adopted. More particularly, the method (1) has a drawback that the shape of the element becomes complicated and the manipulation of the element is inconvenient, the method (2) that non-uniformity in the contact of the element gives rise to non-uniformity in temperature rise to cause measurement errors and that a large error may occur when the element is contaminated with dust or the like, the method (3) takes a long time to heat the element and hence is disadvantageous in the S/N ratio and the time required for measurement, and the method (4) has similar disadvantages to those of method (2). Therefore, no readout instrument which is convenient to use and has a high reliability can be provided employing any of the conventional thermoluminescent methods. Further, a thermoluminescent element loses its recording of dose when it is once heated and its luminescence emission measured. However, a failure in measurement cannot be allowed.

This invention relates to a thermoluminescence readout instrument of a type different from conventional ones and provides a thermoluminescence readout instrument for measuring the dose irradiated on a thermoluminescent dosimeter element comprising; a laser source for heating the element, means for leading laser light rays from said laser source to the element, means for transducing the thermoluminescence emitted from said thermoluminescent dosimeter element into a photocurrent, and means for indicating said photocurrent. One feature of this invention lies in the fact that the element, the thermoluminescence of which is to be measured to determine the amount of dose irradiated on the element, is heated by light rays, more particularly by infrared light rays, thereby increasing the reliability and sensitivity, shortening the time required for heating and measurement, and enabling the heating of an element of an arbitrary shape.

The embodiment of this invention will be described hereinafter with reference to the accompanying drawings, in which.

Figure 1:
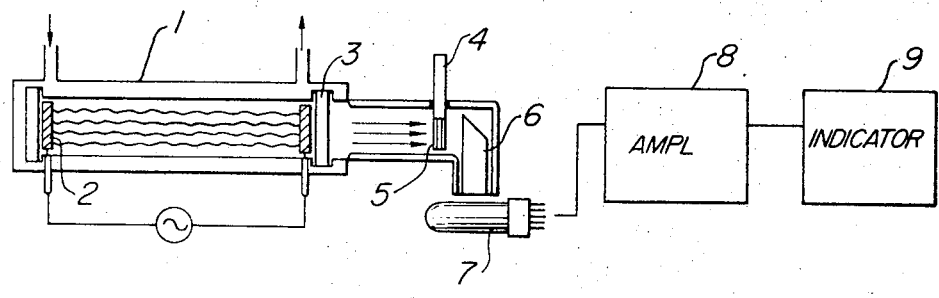
FIG. 1 is a block diagram of an embodiment of the thermoluminescence readout instrument according to the invention.

In FIG. 1, a carbon dioxide gas laser 1 includes electrodes 2 and reflecting mirrors 3, which emits infrared light rays of a wavelength of 10.6 $\mu$ for effectively heating a thermoluminescent dosimeter element 4. It is to be noted that a usual photomultiplier tube is insensitive to this 10.6 $\mu$ radiation. In the resonator, visible light rays may also be generated by helium gas, but these visible light rays are limited in the resonator by the reflecting mirrors and cannot go out of the resonator. The laser light rays of 10.6 $\mu$ are supplied to the dosimeter element 4 for a predetermined time period by the switching of the power source. The element 4 comprises a film-shaped element adhered to a frame. A light shutter 5 has a structure to be open upon loading of an element so as to prevent the direct injection of the laser light rays into a photomultiplier tube 7. A light pipe 6 may transmit visible light rays to the photomultiplier 7, but not the infrared light rays of 10.6 $\mu$. Such a pipe may be made of Pyrex glass (trademark). It is very important to dispose an optical system for cutting off the infrared light rays, such as a light pipe, before the photomultiplier tube.

The laser light rays are irradiated onto the element 4 and heat it to a temperature of 400°C within about 0.5 to 5 seconds. This heating time differs according to the structure of the element 4 and the power of the laser source 1, but with a laser source of about 10 watts an element can be heated to 400°C within 5 seconds.

The element 4 emits thermoluminescence upon heating. These luminescence rays are transmitted to the photomultiplier 7 through the light pipe 6. The photocurrent of the photomultiplier 7 is amplified by a photocurrent amplifying system 8 and digitally indicated in an indicating system 9. That is, the dose is indicated.

Figure 2:
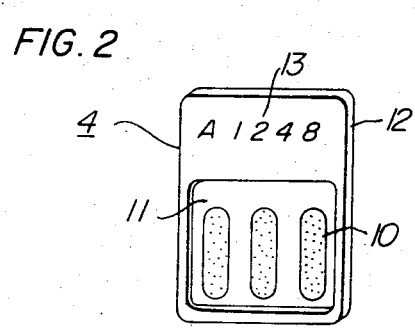
FIG. 2 is a schematic view of a thermoluminescent element.
Figure 3:
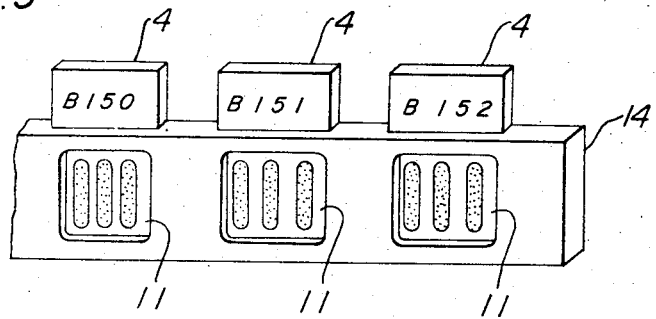
FIG. 3 is a schematic view of a slide plate for loading the elements as shown in FIG. 2 into a readout instrument; nd

Thermoluminescent dosimeter elements are usually formed in the shapes of rod, disk, or a film and the like. The preferable shape of elements for this laser heating type is a film. FIGS. 2 and 3 show embodiments of such elements fitted for laser heating. In the figures, a thermoluminescence emitting portion 10 is a film made of powders of thermoluminescence emitting material set with a resin. A holder 11 holds this element of film shape and is made only of a resin. This holder 11 should be formed of a material of low thermal conductivity to hardly dissipate heat from the element 10 to the exterior and should be thinly shaped. A frame 12 for handling the element is made of a metal or a resin and may be adapted to write in the element identification number 13. A number of such elements may be loaded in a slide 14 for loading into the device.

According to the conventional heating method using a nichrome heating body, it was impossible to heat such a number of elements kept loaded in such a slide, but according to this present light heating method it has now become possible.

Figure 4:
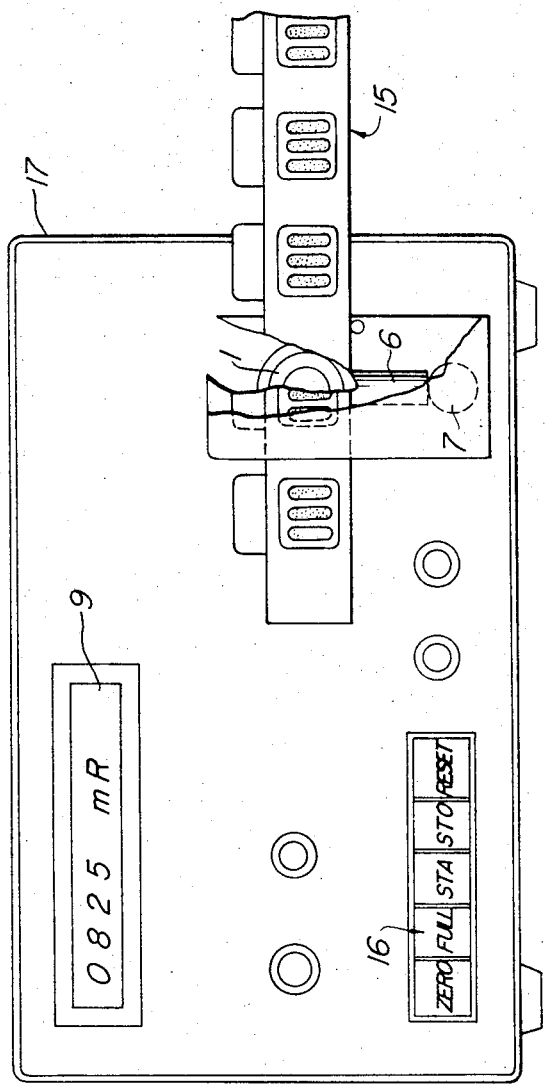
FIG. 4 is a front view of an embodiment of the readout instrument.

FIG. 4 shows an outside view of an embodiment of this invention. In the figure, numeral 15 indicates the elements and their slide, 1 a laser source, 6 a light pipe, 7 a photomultiplier tube, 9 an indicator, 16 operation buttons for measurement and 17 an outer casing. The above-described parts are disposed as is shown in the figure. In this embodiment, by a built-in-cam-mechanism the slide is automatically fed and the measurement is automatically read and printed out by a printer. The details of the structure of a thermoluminescence readout instrument device employing laser heating has been described hereinbefore.

The first feature of the inventive thermoluminescence readout instrument device lies in the point that the heating of an element is reliably carried out. According to the conventional method in which an element is brought into the region of a heater and heated, there may arise problems such as that the element is bent to some extent, and that when dust is attached to the element to affect the thermal conductivity the element there arise errors in the thermoluminescence measurement due to the affected temperature rise. Whereas, according to this invention, the element can be constantly and uniformly heated even when the element is deformed to some extent or dust becomes attached to the element. Namely, this invention provides very good reproducibility in heating an element under any conditions and hence reproducibility and reliability in the measured values.

The second feature of this invention lies in the shortness of the heating time. According to the conventional method, the heating time was usually 10 to 20 seconds, whereas according to laser light heating, time periods of 0.5 seconds for a small element to 5 seconds for a large element are enough to heat the elements to a temperature of 400°C, and hence sufficient for the measurement. This leads not only to a reduction in the time required for measuring operation, but also to an improvement in the sensitivity of measurement. More particularly, the signal of thermoluminescence increases in inverse proportion to the heating time period. Thus, it is found that a heating time of 0.5 to 5 seconds provides a sensitivity 3 to 20 times larger than the conventional one. For example, when about 3 mg of lithium fluoride is shaped to a film-shaped element with a resin, the limiting sensitivity of the conventional method was 10 mR, whereas that of the present method was 1 mR. Namely, an improvement in the sensitivity of the order of 1 or more could be achieved.

Further, since this invention employs direct heating by laser light rays, it is very effective and convenient for the measurement of a multiplicity of elements. As has been described in the embodiment, a plurality of elements may be built in a composite element and a multiplicity of these composite elements may be loaded in a slide and fed by an automatic feeding mechanism with high efficiency. This was impossible according to the conventional method employing a heater.

As described above, the dose irradiated onto a thermoluminescent element can be measured in a short time and with high reliability by a thermoluminescence readout instrument comprising a laser source, in which infrared light rays from the laser source are led to the thermoluminescent element, but prevented from injecting directly into the means for transducing the thermoluminescence from the element into a photocurrent, the element is heated to emit thermoluminescence and the dose is measured from said thermoluminescence.

What is claimed is:

1. A thermoluminescence readout instrument for measuring the dose irradiated on a thermoluminescent dosimeter element comprising; a laser source for heating the element, means for leading laser light rays from said laser source to the element, means for transducing the thermoluminescence emitted from said thermoluminescent dosimeter element into a photocurrent, and means for indicating said photocurrent.

2. A thermoluminescence readout instrument according to claim 1, in which said laser source emits infrared light rays, the instrument further comprising optical means for shutting the infrared light rays in such a manner that the infrared light rays from said laser source are led to said thermoluminescent dosimeter element, but not to said means for transducing the thermoluminescence into a photocurrent.

3. A thermoluminescence readout instrument according to claim 1 wherein said laser source heats said thermoluminescent dosimeter element to a temperature of approximately 400°C.

4. A thermoluminescent readout instrument according to claim 3 wherein said thermoluminescent dosimeter element is heated to a temperature of approximately 400°C for a time interval of between 0.5 and 5.0 seconds.

* * * * *

UNITED STATES PATENT OFFICE
CERTIFICATE OF CORRECTION

Patent No. 3,729,630      Dated April 24, 1973

Inventor(s) YAMASHITA et al

It is certified that error appears in the above-identified patent and that said Letters Patent are hereby corrected as shown below:

The second inventor's name which reads as Osamu Yamamot<u>i</u> SHOULD read Osamu YAMAMOT<u>O</u>.

Signed and sealed this 29th day of January 1974.

(SEAL)
Attest:

EDWARD M. FLETCHER, JR.
Attesting Officer

RENE D. TEGTMEYER
Acting Commissioner of Patents